Patented July 14, 1953

2,645,665

UNITED STATES PATENT OFFICE 2,645,665

FORMALDEHYDE PURIFICATION PROCESS

John C. Walker, Westfield, N. J., and Bernard O. Heston, Norman, Okla., assignors to Cities Service Oil Company, Bartlesville, Okla., a corporation of Delaware No Drawing. Application April 7, 1948, Serial No. 19,634

13 Claims. (Cl. 260—606)

The present invention is directed to the purification of chemical compounds by extraction with a selective solvent, especially to the removal of odorous and acidic impurities from aqueous formaldehyde solutions by extraction.

The formaldehyde of commerce, such as that produced by the direct oxidation of hydrocarbons, has long been recognized as having certain undesirable odorous impurities which tend to depreciate the product. These impurities may be present in very small quantities, yet their effect upon formaldehyde use may be quite pronounced. In the manufacture of resins such as the phenol-formaldehyde resins or melamine-formaldehyde resins the odorous impurities originally present in very minor quantities with the formaldehyde become sharply noticeable in the product when the formaldehyde has been consumed in the resin-forming reaction. Similarly, in formaldehyde used for embalming or for the preservation of animal tissues, small quantities of odorous impurities have a lingering or cumulative effect tending to emphasize their presence. In order to suit formaldehyde to these and other important commercial uses, a considerable effort has been directed toward the removal of these odorous impurities. Both chemical and physical means have been tried without noteworthy success other than at an excessive cost either in treating agents required or in product losses involved.

An object of the present invention is the preparation of aldehyde solutions of improved odor and reduced acidity by an economical solvent extraction process.

Other objects and advantages will appear as the description proceeds.

Our invention comprises a process for the purification of aqueous aldehyde solutions and is based upon the extraction of the impurities contained therein with selected nonreactive solvents in a liquid-liquid system. This purification process as applied to formaldehyde comprises the removal of odorous materials, which are essentially unsaturated alcohols, and a reduction in free acidity, which is essentially formic acid.

The requirements for such a selective solvent are that it must readily dissolve odor bodies and acids while dissolving relatively little aldehyde, must be relatively insoluble in the aqueous aldehyde solution, and must have a boiling point sufficiently below that of the aqueous aldehyde solution so that any small quantities dissolved in the solution may be recovered by flash distillation. We have discovered that certain ethers and esters having alkyl radicals containing not more than five carbon atoms meet these requirements. Among the ethers, we have found that ethyl ether, isopropyl ether, butyl ether and isobutyl ether are satisfactory, and that ethyl acetate and butyl acetate among the esters are also satisfactory.

We prefer, however, to use isopropyl ether in our solvent extraction process, since it best meets the requirements as a solvent in the purification of formaldehyde solutions where odor improvement and reduction in free acidity are desired, especially where such free acidity comprises mainly formic acid. While various other solvents may be used, as noted above, depending upon the type of improvement desired, whether it be acid removal or odor removal, isopropyl ether extraction accomplishes either or both of these functions selectively depending upon the conditions of operation and particularly upon the ratio of ether solvent to formaldehyde solution.

We have found that our liquid phase extraction operates at high efficiency in the range of from 60 to 80° F., and preferably at a temperature of about 70° F., for either odor removal or reduction in free acidity. Solvent extraction may be accomplished at temperatures other than this preferred range, but with less satisfactory results. We have observed that at lower temperatures, such as 40° F., or thereabout, the improvement in extraction was practically nil and the slower diffusion encountered at the lower temperature counter-balanced the more favorable distribution coefficient. At somewhat higher temperatures, of the order of 100° F., or thereabout, we observed a slight decrease in extraction efficiency.

Our preferred operation is at normal or moderate pressures sufficient to maintain the system in liquid phase and to maintain the more volatile phase under such pressure as to eliminate high vapor losses.

In the operation of the solvent extraction system the most critical variables are solvent ratio, column height, and acidity of the solvent. We have found that the most economical solvent ratio for good acid removal and low formaldehyde loss is around 4:1. Extractions at solvent ratios above four give a diminishing increase in acid removal while the formaldehyde loss increases directly with solvent ratio. We accordingly prefer a solvent ratio of the order of 4:1 for acid removal and operations have generally been held to a value of less than 7:1 to maintain a good acid extraction and a reasonable low formaldehyde loss. Any further increase in acid extraction, if desired, may be obtained by employing a taller column to increase the time of contact and the number of theoretical stages in the counter-current extraction system. This is a significant factor in that we have found that formaldehyde loss increases slightly as the column height is increased, while formaldehyde loss by solubility in the ether extract increases sharply with an increase in ratio of ether to formaldehyde.

The influence of solvent ratio and column height on extraction efficiency for acid impurities is shown in the following table:

TABLE I

*Effect of solvent ratio upon acidity reduction of formaldehyde solutions*

| Solvent Ratio | Acidity Reduction, Percent |
|---|---|
| 0.5 | 15 |
| 1.0 | 26 |
| 2.0 | 45 |
| 4.0 | 65 |
| 6.0 | 73 |
| 8.0 | 75 |

Acidity of feed: 0.35 wt. percent.
Acidity of solvent: 0.010 wt. percent.
Temperature: 68° F.
Column packing: 15 ft. of ½ inch ceramic Berl saddles.

TABLE II

*Effect of height of contact column upon acidity reduction of formaldehyde solutions*

| Height of Packing (Feet) | Solvent Ratio | Acidity Reduction, Percent |
|---|---|---|
| 8 | 4.0 | 50 |
| 11.5 | 4.0 | 57 |
| 15.5 | 4.0 | 66 |

Column temperature: 68° F.
Packing: ½ inch Berl saddles.
Acidity of feed: 0.36 wt. percent.
Acidity of solvent: 0.010 wt. percent.

We have further found that the acidity of the solvent is a rather critical variable. In order to reduce the acidity of the raffinate to a desired figure, of the order of 0.10 per cent by weight of formic acid, it is necessary to use a solvent whose acidity is down to about 0.005 per cent by weight. Starting with a formaldehyde solution containing approximately 0.35 per cent by weight of formic acid, a solvent with 0.005 per cent by weight of acidity will reduce the acidity of the formaldehyde about 70 per cent to about 0.11 per cent by weight while a solvent with an acidity of 0.025 per cent by weight will decrease the free acidity in the formaldehyde only about 60 per cent or only to about 0.14 per cent by weight when using a 4:1 solvent ratio.

It will be understood, therefore, that for any given extraction system certain factors in the operational procedure may be varied to give an optimum extraction. Such variables as the ratio of solvent, acidity of the solvent, and control of residence or contact time will be varied with the particular system treated to obtain an optimum result, all of which variations are within the scope of the extraction process here disclosed.

The above criteria are particularly applicable when the solvent extraction system is operated for high acid removal which gives practically complete odor removal as well. Otherwise, where acid values are low as a result of neutralization and distillation, or where acid reduction is not an important factor, the extraction process may be operated essentially for odor improvement, which is in itself a major function of our solvent extraction system for the purification of formaldehyde-water solutions.

A readily discernible test for residual odors is obtained by the sulfite test in which the formaldehyde in a sample is fixed with sodium sulfite, eliminating the odor of formaldehyde and leaving the odorous impurities more evident or undisguised. The residual odor test with sulfite indicates that solvent ratios in the range of 0.5:1.0 to 2.0:1.0 can be used for substantial removal of the pungent odor characteristic of the unsaturated impurities such as alcohols. While lower solvent ratios may be employed, the economic factors of increased column height and multistage operation for effective cleanup supervene over the minor economies of formaldehyde loss so that it is in general preferable to operate in the range of 0.5:1 or more for substantial odor removal and 2.0:1 or more for essentially complete odor removal and significant acid reduction.

Modest changes in the degree of dispersion of the solvent will not materially increase or decrease the efficiency of the extraction operation. Studies on the effect of dispersing the solvent in the feed, or, conversely, dispersing the feed in the solvent showed no outstanding differences in the results obtained by either method.

The following examples will serve to illustrate the method of carrying out our invention, both in the case where substantial reduction of acidic impurities is desirable, and also where the removal of odor bodies alone is important. Alternative methods of regenerating the solvent are also illustrated.

Example 1

An aqueous formaldehyde solution containing 30.1 per cent of formaldehyde, 0.364 per cent of acid as formic acid, and having a bromine number of 119 was contacted with isopropyl ether in the ratio of 4 parts of isopropyl ether to 1 part of the formaldehyde solution in a column, the isopropyl ether passing upwards in countercurrent to the formaldehyde solution. Formaldehyde solution withdrawn from the bottom of the contacting tower contained 29 per cent formaldehyde, 0.125 per cent of acid calculated as formic acid, and had a bromine number of 30. The formaldehyde raffinate also contained about 1 per cent of dissolved isopropyl ether. It was found that the charge stock contained a considerable quantity of odor bodies which could be detected when a sample of the charge stock was treated with sodium sulfite in order to fix the formaldehyde present. The raffinate coming from the tower exhibited no off-odor. Since the odor bodies contained in the charge stock are mostly unsaturated alcohols, it is believed that the reduction in the bromine number is an index of the removal of these odor bodies. It has been found that a reduction of the bromine number in the refined product to a value of 30 or below suffices to give an off-odor-free formaldehyde solution. The contacting of the formaldehyde solution with isopropyl ether was carried out at a temperature of 70° F.

The raffinate formaldehyde solution was then carried to a flash still and was flashed at a temperature of 206° F. It was found that an overhead product was obtained which contained 95 per cent of the isopropyl ether which had been dissolved in the raffinate from the contacting tower, and also contained about 1.9 per cent of the aqueous formaldehyde solution.

The aqueous solution was separated from the isopropyl ether in a separator and was returned to the bottoms product from the flash still.

The isopropyl ether from the separator was added to the ispropyl ether recovered at the top of the contacting column and the impure isopropyl ether containing the odor bodies and the acids removed during the contacting process was subjected to fractionation in order to recover a substantially pure isopropyl ether as an overhead product, which was then recycled to the contacting tower. The bottoms product from the fractionation column contained the impurities removed from the formaldehyde solution in the contacting tower, together with some water and formaldehyde. It was found that a recovery of 99.8 per cent of the isopropyl ether was obtained with a loss of about 5 per cent of the formaldehyde contained in the original charging stock. This formaldehyde loss may be substantially reduced, however, by further processing.

*Example 2*

This example illustrates a preferred mode of carrying out our invention essentially for odor removal, in cases where the presence of minor quantities of acid in the raffinate is not undesirable.

The procedure of Example 1 was followed except that the ratio of isopropyl ether to formaldehyde charge stock was 1:1. The particular charge stock in this example contained 32.3 per cent formaldehyde, 0.358 per cent acid as formic acid, and had a bromine number of 124. The raffinate contained 32.3 per cent formaldehyde, 0.227 per cent of acid as formic acid, and had a bromine number of 29. When the formaldehyde in a sample of the raffinate was fixed with sodium sulfite, it was found that no off-odor could be detected. An overall recovery of 97.4 per cent by weight of the formaldehyde in the original charging stock was obtained.

The impure isopropyl ether from the contacting tower which contained odor bodies, acid, and a small amount of water was treated at normal temperature and pressure with ½ of its volume of an aqueous solution containing 0.25 per cent by weight of sodium bicarbonate and 0.50 per cent by weight of sodium carbonate. The alkaline solution neutralized the acids contained in the impure isopropyl ether and also dissolved the odor bodies contained therein, leaving a substantially pure isopropyl ether having an acid content of less than 0.005 per cent. Since the water wash will dissolve a small but appreciable amount of the solvent, the wash water was subjected to flash distillation at a temperature ranging from 175 to 210° F., by means of which a recovery of 95 per cent of the ether dissolved in the wash water was recovered as an overhead product.

In practicing our purification of formaldehyde we have found that the solvent extraction system accomplishes an odor removal not heretofore accomplished by caustic treating and distillation in the traditional chemical processes. Our process may displace one or more chemical treating and distillation steps in formaldehyde processing, or when used as a purification step supplementary to caustic treating and distillation, will produce formaldehyde of higher purity that could otherwise be obtained.

The formaldehyde of commerce is also subject to stringent requirements as to free acidity. The lower aliphatic acids are particularly undesirable in formaldehyde being utilized in resin or plastics manufacture. Formaldehyde produced by conventional methods must generally be purified to remove these undesirable acidic bodies, the nature of the treatment depending to some extent upon the amount and kind of impurities which are present. In the case of formaldehyde produced by oxidation of gaseous hydrocarbons this purification is usually effected by distillation, with or without a preliminary caustic neutralization. Such operations are generally characterized by loss of formaldehyde arising from condensation and polymerization reactions. It has been observed that condensation losses are particularly high when the formaldehyde has been subjected to preliminary alkali treatment, and is subsequently distilled in the presence of the salts of the aliphatic acids produced in that neutralization step. Additional losses are encountered when the formaldehyde is distilled in the presence of unsaturated alcohols and higher aldehydes, such as are produced in the hydrocarbon oxidation reaction. It is of particular advantage therefor to effect the removal of free acids by a low cost physical means such as our liquid phase solvent extraction system in which the acids are reduced to a free acidity of the order of 0.10 per cent or less. To remove the residual acidity to the point of essentially complete neutrality would require an exceedingly high solvent ratio or drastically increased extraction equipment. We have found it more economical to remove the major part of the free acids by our solvent extraction process and thus prepare a formaldehyde solution of low acidity for subsequent treatment to remove residual acidity by means particularly suited to the removal of trace quantities of free acids, such as with ion exchange resins. Our invention is thus operative alone or in conjunction with ion exchange resin systems to reduce the free acidity in aldehyde solutions, such as formaldehyde, to commercially acceptable standards, of the order of 0.02 per cent of formic acid or less in a practical and economical manner.

While the above description has largely been directed toward the purification of formaldehyde solutions comprising the removal of odorous and acidic impurities with isopropyl ether, we have also found that homologous aldehyde systems may similarly be improved by our formaldehyde purifying technique. Acetaldehyde-water systems containing an appreciable quantity of acetic acid as an impurity when solvent extracted with isopropyl ether are beneficially and efficiently purified by the removal of acidic impurities. We have also found that related alkyl ethers and esters, such as n-butyl ether and butyl acetate are effective solvents for the purification of acetaldehyde-water systems. It is evident that a given system comprising a lower alkyl aldehyde-water solution containing a modest quantity of related organic acids and odor bodies as impurities may be purified by a proper selection of solvents of the classes above disclosed.

Various modifications and alterations of the described process and apparatus may be made and practiced without departing from the essence of our invention.

Having thus described our invention in its broader aspects and illustrated it by the use of specific examples, what we claim as new is:

1. A process for the purification of aqueous formaldehyde solutions comprising contacting in countercurrent an aldehyde solution containing unsaturated alcohols and other odor bodies and acids with a solvent selected from the group consisting of ethers and esters having the formula ROR' and RCOOR' in which R and R' are alkyl radicals containing not more than five carbon atoms, in a ratio of from 0.5 to 7.0 parts of solvent to 1.0 part of aldehyde solution.

2. A process for the purification of aqueous formaldehyde solutions comprising contacting in countercurrent an aldehyde solution containing unsaturated alcohols and other odor bodies with a solvent selected from the group consisting of ethers and esters having the formula ROR' and RCOOR' in which R and R' are alkyl radicals containing not more than five carbon atoms, in a ratio of from 0.5 to 2.0 parts of solvent to 1.0 part of aldehyde solution, and recovering an essentially off-odor-free aldehyde solution.

3. A process for the purification of aqueous formaldehyde solutions comprising contacting in countercurrent an aldehyde solution containing unsaturated alcohols and other odor bodies and acids with a solvent selected from the group consisting of ethers and esters having the formula ROR' and RCOOR' in which R and R' are alkyl radicals containing not more than five carbon atoms, in a ratio of from 2.0 to 7.0 parts of solvent to 1.0 part of aldehyde solution, and recovering an essentially off-odor-free aldehyde solution having a substantially reduced acid content.

4. A process for the purification of aqueous formaldehyde solutions comprising contacting in countercurrent an aldehyde solution containing unsaturated alcohols and other odor bodies with a solvent selected from the group consisting of ethers and esters having the formula ROR' and RCOOR' in which R and R' are alkyl radicals containing not more than five carbon atoms, in a ratio of from 0.5 to 2.0 parts of solvent to 1.0 part of aldehyde solution, flash distilling the aldehyde solution at a temperature of from about 190° F. to about 210° F. after treatment with the solvent to recover substantially all the solvent dissolved therein, recovering an essentially off-odor-free aldehyde solution, purifying the solvent after contact with the formaldehyde solution, and recycling the purified solvent to the system.

5. A process for the purification of aqueous formaldehyde solutions comprising contacting in countercurrent an aldehyde solution containing unsaturated alcohols and other odor bodies and acids with a solvent selected from the group consisting of ethers and esters having the formula ROR' and RCOOR' in which R and R' are alkyl radicals containing not more than five carbon atoms, in a ratio of from 2.0 to 7.0 parts of solvent to 1.0 part of aldehyde solution, flash distilling the aldehyde solution at a temperature of from 190° F. to about 210° F. after treatment with the solvent to recover substantially all the solvent dissolved therein, recovering an essentially off-odor-free aldehyde solution having a substantially reduced acid content, purifying the solvent after contact with the formaldehyde solution, and recycling the purified solvent to the system.

6. A process for the purification of aqueous formaldehyde solutions comprising contacting in countercurrent an aldehyde solution containing unsaturated alcohols and other odor bodies and acids with a solvent selected from the group consisting of ethers and esters having the formula ROR' and RCOOR' in which R and R' are alkyl radicals containing not more than five carbon atoms, in a ratio of from 0.5 to 7.0 parts of solvent to 1.0 part of aldehyde solution at a temperature of from about 60° F. to 80° F., flash distilling the aldehyde solution at a temperature of from about 190° F. to about 210° F. after treatment with the solvent to recover substantially all the solvent dissolved therein, recovering an essentially off-odor-free aldehyde solution having a substantially reduced acid content, purifying the solvent after contact with the formaldehyde solution, and recycling the purified solvent to the system.

7. A process for the purification of aqueous formaldehyde solutions comprising contacting in countercurrent an aldehyde solution containing unsaturated alcohols and other odor bodies and acids with isopropyl ether in a ratio of from 0.5 to 7.0 parts of isopropyl ether to 1.0 part of aldehyde solution.

8. A process for the purification of aqueous formaldehyde solutions comprising contacting in countercurrent an aldehyde solution containing unsaturated alcohols and other odor bodies and acids with ethyl acetate in a ratio of from 0.5 to 7.0 parts of ethyl acetate to 1.0 part of aldehyde solution.

9. A process for the purification of aqueous formaldehyde solutions comprising contacting in countercurrent an aldehyde solution containing unsaturated alcohols and other odor bodies with isopropyl ether in a ratio of from 0.5 to 2.0 parts of isopropyl ether to 1.0 part of aldehyde solution, and recovering an essentially off-odor-free aldehyde solution.

10. A process for the purification of aqueous formaldehyde solutions comprising contacting in countercurrent an aldehyde solution containing unsaturated alcohols and other odor bodies and acids with isopropyl ether in a ratio of from 2.0 to 7.0 parts of isopropyl ether to 1.0 part of aldehyde solution, and recovering an essentially off-odor-free aldehyde solution having a substantially reduced acid content.

11. A process for the purification of aqueous formaldehyde solutions comprising contacting in countercurrent an aldehyde solution containing unsaturated alcohols and other odor bodies and acids with isopropyl ether in a ratio of from 0.5 to 7.0 parts of isopropyl ether to 1.0 part of aldehyde solution at a temperature of from about 60° F. to 80° F., flash distilling the aldehyde solution at a temperature of from about 190° F. to about 210° F. after treatment with the solvent to recover substantially all the solvent dissolved therein, purifying the solvent after contact with the formaldehyde solution, and recycling the purified solvent to the system.

12. A process for the purification of aqueous formaldehyde solutions comprising continuously contacting a formaldehyde solution containing unsaturated alcohols and other odor bodies and acids with a solvent selected from the group consisting of alkyl ethers and esters in which the alkyl radicals contain not more than five carbon atoms, separating the solvent containing extracted impurities from the formaldehyde solution, subjecting the solvent to fractionation to recover substantially purified solvent as an overhead fraction, and recycling the purified solvent to the formaldehyde contacting step.

13. A process for the purification of aqueous formaldehyde solution comprising continuously contacting a formaldehyde solution containing unsaturated alcohols and other odor bodies and acids with a solvent selected from the group consisting of alkyl ethers and esters in which the alkyl radicals contain not more than five carbon atoms, separating the solvent containing extracted impurities from the formaldehyde solution, washing the solvent with water containing in solution an alkaline compound selected from the group consisting of sodium carbonate, sodium bicarbonate, and mixtures thereof, separating a substantially purified solvent from the washing step, and recycling the solvent to the formaldehyde contacting step.

JOHN C. WALKER.
BERNARD O. HESTON.

References Cited in the file of this patent

UNITED STATES PATENTS

| Number | Name | Date |
| --- | --- | --- |
| 1,948,069 | Fuchs et al. | Feb. 20, 1934 |
| 2,452,414 | Wong | Oct. 26, 1948 |
| 2,529,622 | Michael | Nov. 14, 1950 |

FOREIGN PATENTS

| Number | Country | Date |
| --- | --- | --- |
| 568,529 | Great Britain | Apr. 10, 1945 |

OTHER REFERENCES

International Critical Tables, vol. III, p. 422 (1928), McGraw-Hill Book Co.

Handbook of Chemistry by Lange, 6th ed., 1946, Handbook Pub., Inc. Sandusky, Ohio, pp. 340-41 and 502-03.

Handbook of Chemistry and Physics by Hodgman, 28th ed., 1944, Chemical Rubber Pub. Co., Cleveland, Ohio, pp. 578-79 and 784-87.